May 1, 1956  B. GROSS  2,744,182
INDICATOR FOR RESISTANCE WELDING
Filed Nov. 23, 1953  2 Sheets-Sheet 1

INVENTOR.
*B. GROSS*
BY
*S. Tierney Jr*

May 1, 1956  B. GROSS  2,744,182
INDICATOR FOR RESISTANCE WELDING
Filed Nov. 23, 1953  2 Sheets-Sheet 2
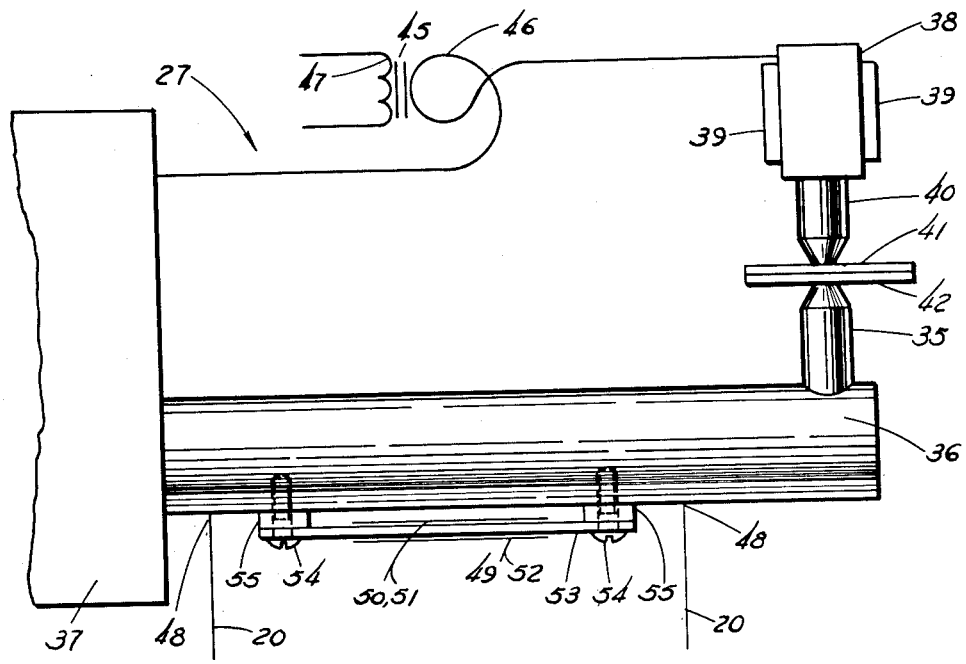
Fig. 3
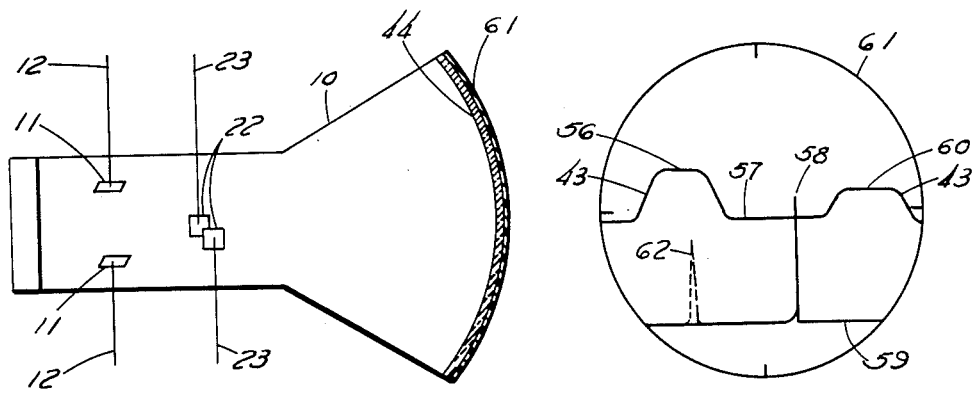
Fig. 4
Fig. 5
INVENTOR.
B. GROSS
BY S. Tierney Jr United States Patent Office 2,744,182
Patented May 1, 1956

2,744,182

INDICATOR FOR RESISTANCE WELDING

Bernard Gross, San Diego, Calif., assignor to Rohr Aircraft Corporation, Chula Vista, Calif., a corporation of California Application November 23, 1953, Serial No. 393,787

3 Claims. (Cl. 219—4)

This invention relates to resistance welding of metallic sheets and to an instrument for visually indicating the several factors which control the quality of the weld.

In resistance welding machines, adjustable pressure controls are usually provided for changing the pressure applied to the sheets to be welded, current controls for changing the current passed through the sheets to heat them to the point of fusion at their contacting faces and timing devices for controlling the sequence of occurrence of these variables. It is difficult to set these several controls at positions which produce the strongest welds, especially when welding thin aluminum and other soft metals. It is a main purpose of the present invention to provide an instrument which may be connected to a spot or other type resistance welding machine to indicate the changes in pressure and current and their sequence of occurrence to each other which take place during the welding cycle so that the operator can quickly determine whether the several controls are properly set or need adjustment.

A further object is to indicate the progress of the welding cycle by the trace of a cathode ray tube and to provide suitable circuit connections from the welding machine to the control electrodes of the tube which will cause the trace to correctly represent the several factors involved in the welding cycle in properly timed relation.

A still further object is to provide a standard of comparison which may be placed over the screen of the cathode ray tube and with which the trace may be directly compared to determine if the weld represented by the trace is up to standard.

Further objects of the invention will become apparent as the description of the instrument proceeds. For a better understanding of the invention, reference is made to the accompanying drawings in which:

Fig. 3 is a schematic view showing portions of a spot welding machine and pressure and current pickups associated therewith;

Fig. 4 is a view partly in section and partly schematic of portions of a cathode ray tube and;

Figs. 5 and 6 are views of patterns used as a standard of comparison.

Figure 1:
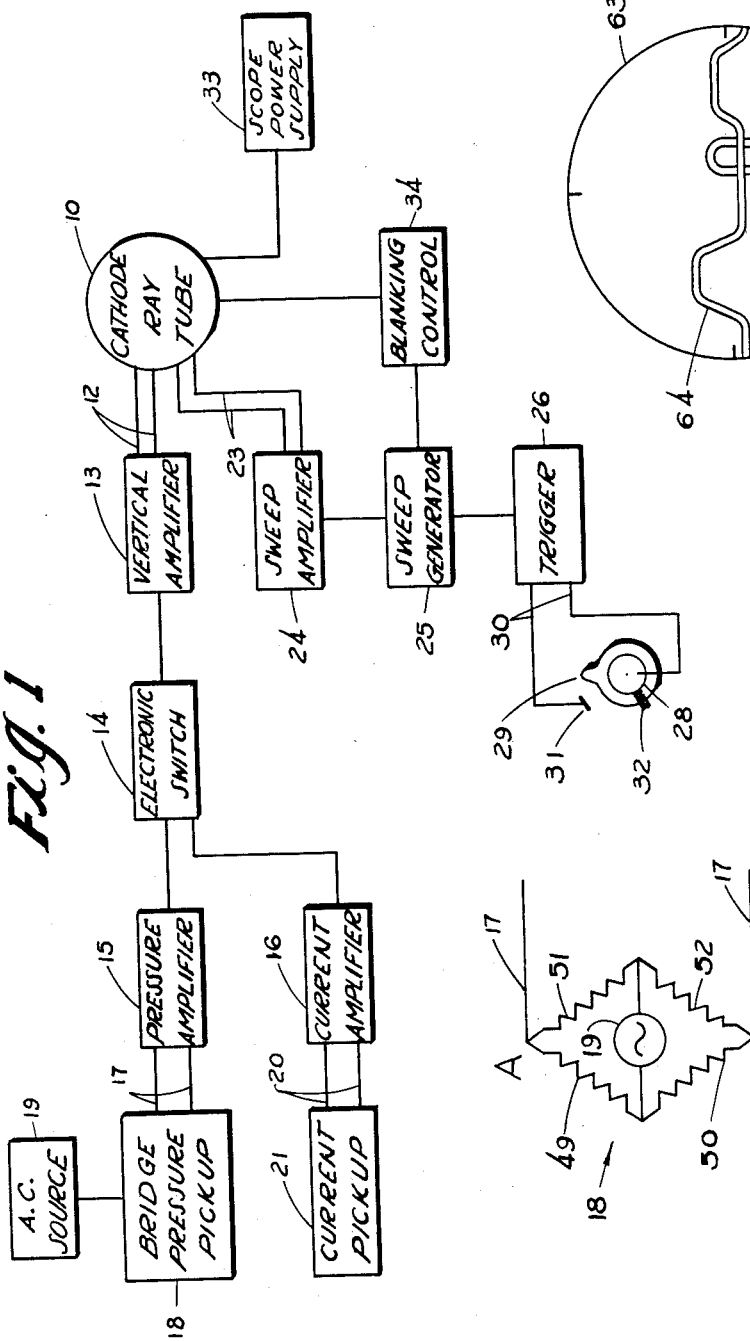
Fig. 1 is a schematic circuit diagram of an electrical instrument embodying the invention.

Referring to Fig. 1, the electron beam of a cathode ray tube 10 is vertically deflected by voltage variations imposed on the vertical deflecting plates 11 by the leads 12 connected to the output terminals of vertical amplifier 13. The input terminals of amplifier 13 are connected to an electronic switch 14 which supplies voltage variations from pressure amplifier 15 and current amplifier 16 to amplifier 13. Amplifier 15 is supplied by leads 17 with a variable voltage from a pressure pickup 18 to which current is supplied from an A. C. source 19 in a manner to be described. Amplifier 16 is supplied by leads 20 with a variable voltage from a current pickup 21. The horizontal deflections of the electron beam are due to a variable voltage impressed on the horizontal deflecting plates 22 of tube 10 by a pair of leads 23 connected to the output of a sweep amplifier 24. Amplifier 24 is supplied with a variable voltage developed in sweep generator 25 under the control of a trigger device 26. The operation of trigger 26 is coordinated with a moving part of the welding machine 27, portions of which are shown in Fig. 3. The machine has a cam shaft 28 on which cams (not shown) are mounted which control the sequence and timing of the welding elements in a known manner and also a cam 29 which closes the energizing circuit 30 of the trigger when it engages a contact 31. Any suitable means may be used for controlling the instant of closure of circuit 30, that shown comprising a set screw 32 adapted to lock cam 29 in any desired angular position on shaft 28. A power source 33 of known type supplies current to the several electrodes of tube 10 and the beam is blanked out during its return path by a blanking device 34 of any suitable known type. Switch 14, sweep generator 25, trigger 26, blanking device 34 and the several amplifiers contain vacuum tubes connected together in a known manner (not shown).

Figure 2:
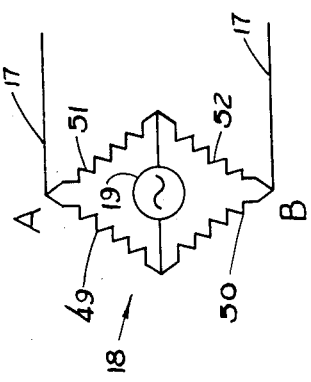
Fig. 2 is a circuit diagram of a pressure pickup used with the instrument.

Figs. 2 and 3 show a preferred method for connecting the pressure and current pickups to the welding machine 27. Lower welding electrode 35 is carried by copper horn 36 one end of which is secured to a rigid copper support 37 fastened to the main frame (not shown) of the welding machine. A copper slide 38 mounted for vertical reciprocation in ways 39 carries upper electrode 40, slide 38 being reciprocated by any known means (not shown) such as a rotating cam or a hydraulic pressure cylinder to press upper sheet 41 against lower sheet 42 with a suitable pressure to effect a proper weld when the welding current passes through the sheets. This pressure is controllable over a substantial range in a known manner by any suitable means (not shown) and its amount is indicated by trace 43 on the fluorescent screen 44 of tube 10. Welding current is supplied by a step-down transformer 45 whose secondary winding 46 is connected to support 37 and slide 38. Adjustable current and timing controls (not shown) of any known type are provided to control the current supplied to primary winding 47.

Current pickup 21 is secured by connecting leads 20 to points 48 on horn 36 which are spaced apart a distance sufficient to secure a substantial voltage drop due to the flow of welding current through cylindrical horn 36. The ends of the wires may be secured to the horn by soldering or by suitable clamps (not shown). Or the current pickup could comprise a wire coil of many turns wound around either lower electrode 35 or upper electrode 40, the ends of such coil being connected to leads 20.

Pressure pickup 18 is a strain gage arranged as a Wheatstone bridge and having four wires 49, 50, 51, 52 connected together and to current source 19 and leads 17 as shown in Fig. 2. Wires 50 and 51 are connected to the top of a metal strip 53 and wires 49 and 52 to the bottom of the strip, these connections being made by an elastic bonding cement which also insulates the wires from the strip. The ends of strip 53 are firmly secured to horn 36 by two or more screws 54 which pass through a pair of metal spacers 55 which provide suitable clearance between wires 50, 51 and horn 36. As the downward pressure of electrode 40 progressively increases, the end of horn 36 at the right bends down a small amount and the right hand end of strip 53 lowers a corresponding amount causing wires 50, 51 and the cement surrounding them to be put under tension and wires 49, 52 and the cement around them to be put under compression. With no pressure applied to sheets 41, 42 by electrode 40, the bridge is balanced and its conjugate points A and B are at the same potential. As the pressure on electrode 40 increases, it causes horn 36 to bend increasingly and cause wires 50, 51 to be placed under tension and elongated with a corresponding increase in their resistance. This causes a potential difference in a certain direction between points A and B. This potential difference is increased by the simultaneous decrease in the resistance of wires 49 and 52. It follows that the voltage across the points A, B varies with the pressure applied to sheets 41, 42 by the welding electrodes and this pressure change during the weld causes a corresponding vertical displacement of the electron beam. The trace 43 shown in Fig. 5 is typical of the pressures secured during a welding cycle when welding aluminum alloy sheets about 1/16 inch thick. Starting at the left the trace indicates an abrupt increase in pressure to establish a forming pressure indicated at 56 of substantial duration after which a rapid drop in pressure takes place to a welding pressure 57 which is substantially steady for a short time. While the welding pressure is applied, a large welding current flows between electrodes 35, 40 which fuses sheets 41, 42 at their contacting faces to form a small weld nugget. This sudden flow of welding current causes a potential drop between points 48 (Fig. 3) which is indicated on the screen by an abrupt rise 58 in the welding current trace 59. Shortly after the welding current has stopped, the electrode pressure increases again to a forging pressure indicated at 60 which persists while the welding nugget is cooling and solidifying. After this the welding pressure decreases as upper electrode 40 is raised until it reaches zero when the welding cycle is complete. Cam 29 is preferably set at a position on shaft 28 which initiates the action of trigger 26 so that the horizontal sweep of the beam is not commenced until upper welding electrode 40 touches sheet 41. The trigger 26 and amplifier 24 then continue sweeping the beam in one direction during the welding cycle, the beam being blanked out while on its return trace by blanking control 34. This arrangement prevents beam traces from appearing on screen 44 when no welding is going on. Assuming the welding cycle described to produce a weld of adequate strength to hold the sheets 41, 42 together, a full size photograph is then taken on film of the end of tube 10 during a welding operation by supporting a camera in line with the tube axis. After finishing the photographic negative and trimming it to the shape and size of the end of the tube, it will contain exact reproductions of pressure trace 43 and current trace 59 on transparent film. This negative 61 is now attached in any suitable manner to the end of tube 10 as by cementing, clamping or other known means. The pressure and current graphs on negative 61 serve as a standard of comparison with which the operator may compare the traces obtained on the screen 44 as each weld is made to determine if the current and pressure controls of the welding machine are properly adjusted. For example, if a current trace indicated by dash lines at 62 is secured on screen 44 during a weld, by comparing it with the standard current peak 58 on film 61, the operator will know that the weld does not have the proper strength. He will also realize that the controls of the machine which control the timing and amplitude of the welding current are not properly set to produce the best weld and need adjusting. The beam trace on screen 44 may be observed as the adjustments are made and when it matches the graph or pattern on film 61, serves as an indication that the controls are properly set to produce the best weld.

Figure 6:
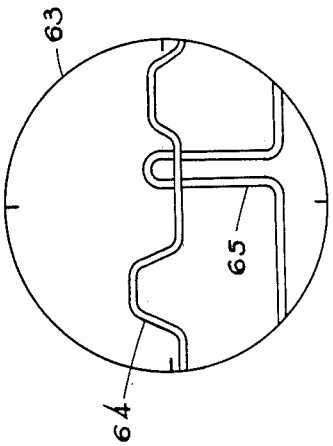

Instead of securing fine line pressure and current traces by having the electron beam well focused on screen 44, these may be widened by misfocusing it by an amount sufficient that the edges of the traces indicate the positive and negative tolerances of the variables. By photographing screen 44 including such wide traces and making a positive of the negative on flexible film, a positive 63 of the type shown in Figure 6 is secured. The bands 64 and 65 are transparent and surrounded by the black area of the film. When welding, if the entire pressure trace on screen 44 is visible to the operator through band 64, it indicates that the several pressures above mentioned come within the prescribed tolerances. Also if the entire trace 59 of the welding current is visible through transparent band 65, it indicates that the welding current is properly timed and within the prescribed amplitude tolerance.

Instead of attaching the strain gages to strip 53, the wires 50, 51 may be cemented to the top of horn 36 and the wires 49, 52 cemented to the bottom thereof. The increase in resistance of wires 50, 51 and the decrease in resistance of wires 49, 52 due to the flexure of horn 36 contribute to the unbalancing of the bridge as before.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described my invention, what I claim as new and useful and desire to secure by Letters Patent is:

1. Means for pressing and welding together upper and lower contacting metal sheets and for simultaneously indicating the variable pressure applied to the sheets comprising, in combination: a stationary member; a long cantilever support having one end anchored to said member, said cantilever support being constructed to bend under said variable pressure and having high electric conductivity; a lower welding electrode in contact with and secured to the free end of said cantilever support, the top of said lower electrode being in contact with the bottom face of said lower sheet; an upper welding electrode in contact with the top face of said upper sheet and supported for downward movement sufficient to press said upper sheet against said lower sheet and simultaneously bend said cantilever support; a source of welding current connected to said cantilever support and to said upper electrode; a resistor; means connecting said resistor to said cantilever support and constructed to insulate said resistor therefrom and to change the physical dimensions and resistance of said resistor in response to the bending of said cantilever support; a current source connected to supply current to said resistor; an amplifier connected to the terminals of said resistor for amplifying the voltage variations between said terminals; and visual indicating means connected to the output of said amplifier and constructed to indicate the instantaneous amplitudes of said amplified voltage variations.

2. Means for indicating the variable pressure applied to two contacting metal sheets by a pair of welding electrodes in engagement with the sheets comprising, in combination: a cantilever support in contact with one of said electrodes and supporting said electrode on the free end of said support, said support being bent by pressure of the sheets on said one electrode; a normally balanced Wheatstone bridge comprising four strain gages; means supporting said bridge on said cantilever in a manner to increase the resistance of two oppositely disposed strain gages and to simultaneously decrease the resistance of the remaining two strain gages in response to the bending of said cantilever; a source of voltage connected across one diagonal of said bridge; an oscilloscope having horizontal and vertical deflecting plates; an amplifier having its input connected across the other diagonal of said bridge; a circuit connecting the output of said amplifier to said vertical deflecting plates; and a sweep generator connected to said horizontal deflecting plates whereby the beam trace represents the variable welding pressure.

3. Means for pressing and welding together upper and lower contacting metal sheets and for simultaneously indicating the variable pressure applied to the sheets comprising, in combination: a stationary member; a long cantilever having one end anchored to said member, said cantilever being constructed to bend under said variable pressure and having high electric conductivity; a lower welding electrode in contact with and secured to the free end of said cantilever, the top of said lower electrode being in contact with the bottom face of said lower sheet; an upper welding electrode in contact with the top face of the upper sheet and supported for downward movement sufficient to press said upper sheet against said lower sheet and simultaneously bend said cantilever; a source of welding current connected to said cantilever and to said upper electrode; a resistor having first and second portions connected to a common intermediate terminal; a current source connected to said resistor; means for supporting said resistor by said cantilever and for insulating said resistor from the cantilever, said resistor supporting means being constructed to tension said first resistor portion and to simultaneously compress said second resistor portion in response to the bending of said cantilever under the pressure of said upper electrode against the upper sheet; an amplifier having its input terminals connected to the ends of said resistor; an oscilloscope having horizontal and vertical deflecting plates; a circuit connecting said vertical deflecting plates to the output of said amplifier; and a sweep circuit connected to said horizontal deflecting plates to provide a sweep control of the electron beam simultaneously with its deflection by said vertical deflection plates.

References Cited in the file of this patent
UNITED STATES PATENTS

| | | |
|---|---|---|
| 2,322,052 | Ogden et al. | June 15, 1943 |
| 2,430,237 | Moncher | Nov. 4, 1947 |
| 2,449,093 | Weingarten | Sept. 14, 1948 |
| 2,616,014 | Ellerby | Oct. 28, 1952 |
| 2,657,133 | Weingarten et al. | Oct. 27, 1953 |